(12) United States Patent
Gopal et al.

(10) Patent No.: US 8,392,494 B2
(45) Date of Patent: Mar. 5, 2013

(54) METHOD AND APPARATUS FOR PERFORMING EFFICIENT SIDE-CHANNEL ATTACK RESISTANT REDUCTION USING MONTGOMERY OR BARRETT REDUCTION

(75) Inventors: Vinodh Gopal, Westborough, MA (US); Gilbert M. Wolrich, Framingham, MA (US); Wajdi K. Feghali, Boston, MA (US); James D. Guilford, Northborough, MA (US); Erdinc Ozturk, Marlborough, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 12/459,152

(22) Filed: Jun. 26, 2009

(65) Prior Publication Data

US 2010/0332578 A1    Dec. 30, 2010

(51) Int. Cl.
*G06F 7/52* (2006.01)
*G06F 17/30* (2006.01)

(52) U.S. Cl. ........ 708/650; 708/651; 708/492; 380/282; 380/30; 380/28

(58) Field of Classification Search ................. 708/650, 708/651; 380/282, 28, 30
See application file for complete search history.

(56) References Cited

U.S. PATENT DOCUMENTS

| | | | |
|---|---|---|---|
| 8,112,468 B1 * | 2/2012 | Redgrave et al. | 708/625 |
| 8,271,570 B2 * | 9/2012 | Gopal et al. | 708/492 |
| 2004/0148325 A1 * | 7/2004 | Endo et al. | 708/492 |
| 2007/0150530 A1 | 6/2007 | Mevergnies et al. | |
| 2007/0297601 A1 | 12/2007 | Hasenplaugh et al. | |
| 2008/0059711 A1 | 3/2008 | McKeen et al. | |
| 2008/0133935 A1 * | 6/2008 | Elovici et al. | 713/193 |
| 2009/0003595 A1 * | 1/2009 | Ozturk et al. | 380/30 |
| 2010/0198846 A1 * | 8/2010 | Gupta | 707/757 |

OTHER PUBLICATIONS

Office Action received for European Patent Application No. 10250849.6, mailed on Oct. 7, 2010, 5 pages.
Office Action Received for European Patent Application No. 10250849.6, mailed on Jul. 13, 2011, 8 pages of Office Action.
Supplementary European Search Report for European Patent Application No. 10250849.6, mailed on Jun. 20, 2011, 7 pages.
European Search Report received for European Patent Application No. 10250849.6, Mailed on Feb. 24, 2011, 8 pages.
Parhami, "Analysis of Tabular Methods for Modular Reduction", Twenty-Eighth Asilomar Conference on Signals, Systems and Computers, vol. 1, Oct. 31-Nov. 2, 1994, pp. 526-530.
Kong et al., "Hardware-Software Integrated Approaches to Defend Against Software Cache-based Side Channel Attacks", IEEE 15th International Symposium on High Performance Computer Architecture, Feb. 14-18, 2009, pp. 393-404.
Percival, Cache missing for fun and profit, Paper Accompanying a Talk at the BSDCAN 2005 Conference, May 14, 2005, 13 pages.
Menezes, et al., "Handbook of Applied Cryptography", Chapter 14—Efficient Implementation, CRC Press, 1996, pp. 591-634.
Spadavecchia, Ljiljana, "A Network-based Asynchronous Architecture for Cryptographic Devices", 2005, 250 pages.

(Continued)

*Primary Examiner* — Tammara Peyton
(74) *Attorney, Agent, or Firm* — Forefront IP Lawgroup, PLLC

(57) ABSTRACT

A time-invariant method and apparatus for performing modular reduction that is protected against cache-based and branch-based attacks is provided. The modular reduction technique adds no performance penalty and is side-channel resistant. The side-channel resistance is provided through the use of lazy evaluation of carry bits, elimination of data-dependent branches and use of even cache accesses for all memory references.

8 Claims, 8 Drawing Sheets

OTHER PUBLICATIONS

Office Action received for European Patent Application No. 10250849.6, mailed on Feb. 14, 2012, 4 pages.

Koren, "Computer Arithmetic Algorithms", 2nd Edition, A K Peters, Natick Massachusetts, University of Massachusetts, Amherst, 2001, 6 pages.

* cited by examiner

METHOD AND APPARATUS FOR PERFORMING EFFICIENT SIDE-CHANNEL ATTACK RESISTANT REDUCTION USING MONTGOMERY OR BARRETT REDUCTION

FIELD

This disclosure relates to public key cryptography and in particular to modular reduction used in public key cryptography that is side-channel attack resistant.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

Typically, a processor includes a Public Key Encryption (PKE) unit that performs cryptographic computations with very high performance. The PKE unit accelerates large modular exponentiation problems and is optimized to work with operands in the range of 512 to 4096 bits.

In order to provide high-performance, these operations are performed using a variable number of operations. A side-channel attack is an attack based on information that can be used to learn the secret keys that is obtained from a physical implementation of a cryptosystem. For example, the information may be timing information or power consumption. A power monitoring attack is an attack that uses varying power consumption by a device during computation. A timing attack is an attack based on measuring how much time it takes to process different inputs, for example, due to performance optimizations to bypass unnecessary operations, branching, cache memory and operations (for example, multiplication and division) that run in a non-fixed time. Also, it may be possible to determine a key by observing data movement to/from memory or from/to a processor and measuring how long it takes to transfer information associated with a key.

One known method to prevent side-channel timing attacks is to design a program so that it is isochronous, that is, so it runs in a constant amount of time, independent of secret key values. However, this results in a significant loss in performance.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A program can leak vital information to a spy process that times events. These timed events include branch mis-predictions and cache line misses. If these timed events are data dependent and more specifically dependent on the value of a key used in a cryptographic algorithm, then by observing variances in timing of the program, the spy process can recover partial or even full information about the key.

In protocols such as RSA or DH the main operation is a large modular exponentiation with operands in the range of 512 to 4096 bits (or higher for ultra-secure applications). As many processors have native wordsizes of only 32 or 64 bits, modular arithmetic is used to avoid working with the large operands.

In modular arithmetic, the result of an operation is a number (N) in the range between 0 and the modulus (M). A number N is congruent with X (mod Y), where N is the remainder after X is divided by Y, for example, if X=7 and Y=3. N=7(mod 3)=1, that is, the remainder is 1 when 7 is divided by 3, so N=1 is congruent with 7(mod 3).

Exponentiation algorithms may perform repeated modular squaring or multiplication operations, which consist of multiplication operations followed by modular reduction. The modular reduction may be performed by a variety of techniques such as Montgomery reduction or Barrett's reduction. However, because these modular reduction techniques are not side-channel attack resistant, a spy process may recover information about the key.

Figure 1:
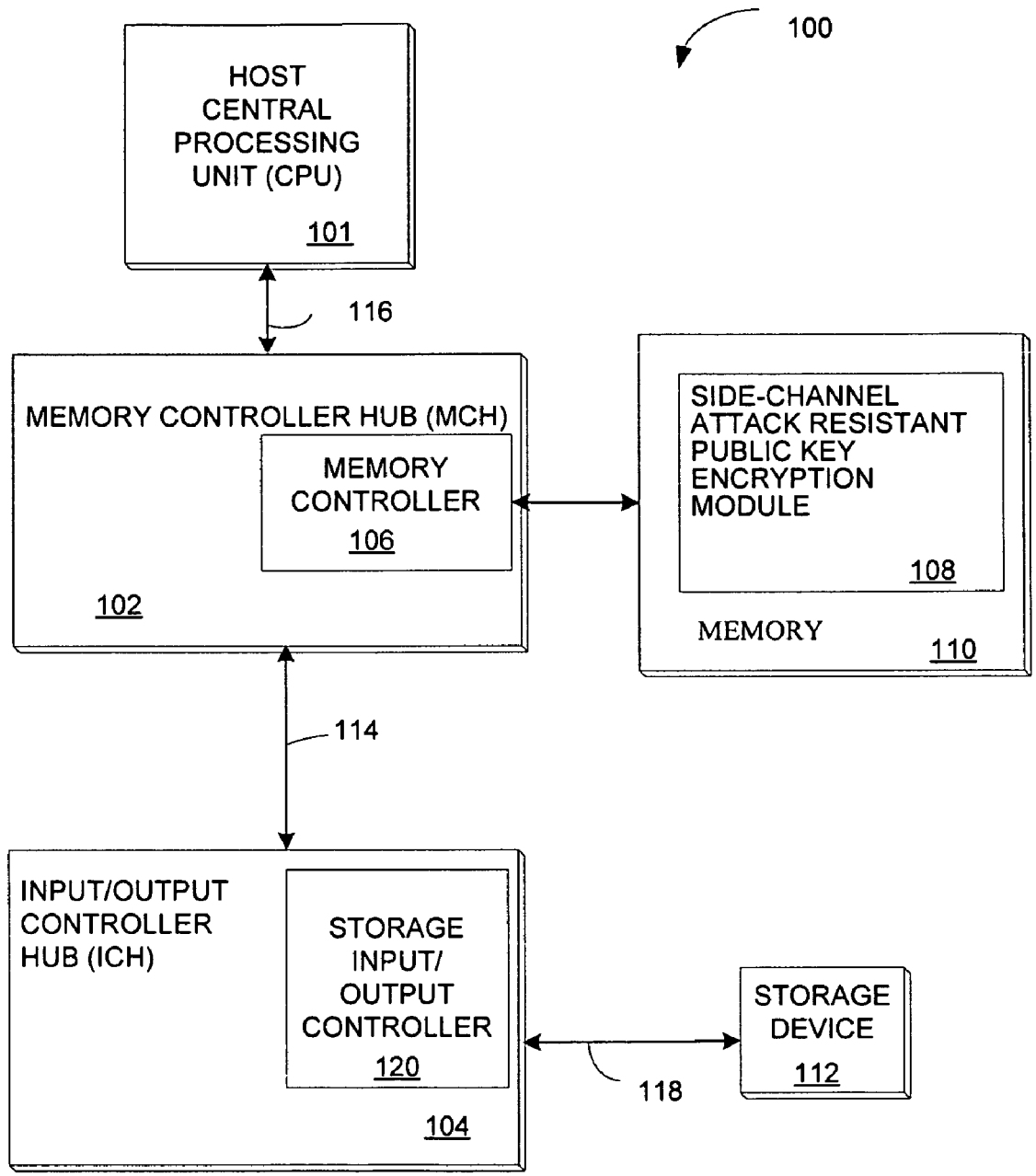
FIG. 1 is a block diagram of a system that includes an embodiment of a side-channel attack resistant public key encryption module.

FIG. 1 is a block diagram of a system 100 that includes an embodiment of a side-channel attack resistant public key encryption module 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 110. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage Input/Output (I/O) controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

A side-channel attack resistant public key encryption module 120 may be stored in memory 108. The public key encryption module 120 includes processor instructions to be executed by the CPU 101 to perform public key encryption. In an embodiment, CPU 101 is a high-performance processor core that includes an x86 instruction set.

Figure 2:
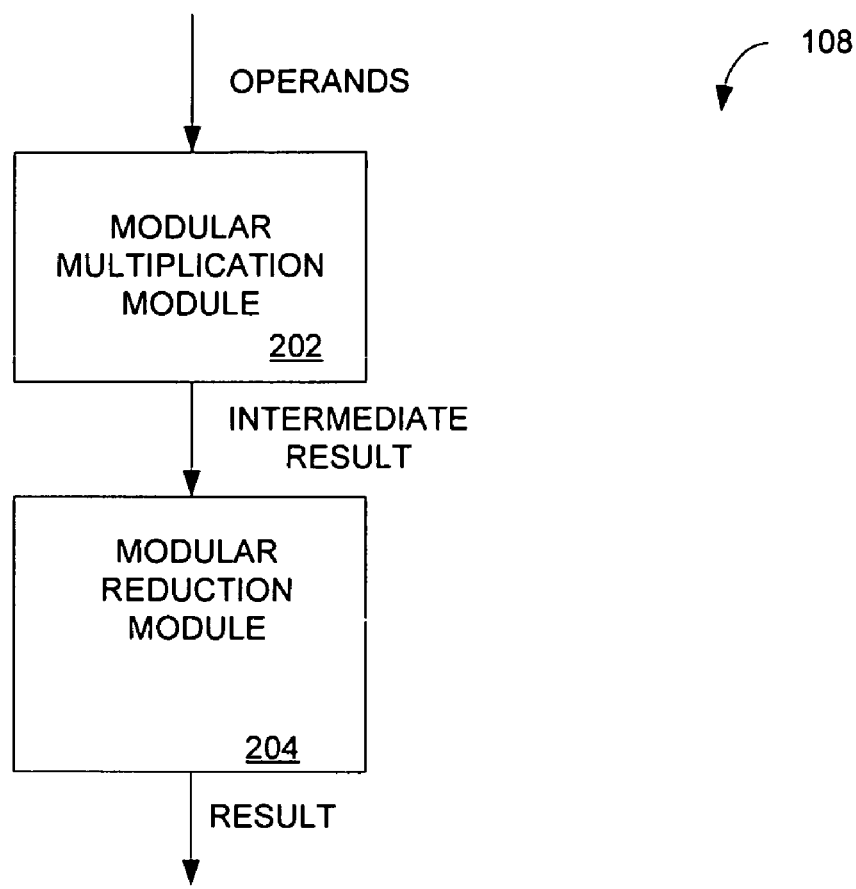
FIG. 2 is a block diagram illustrating modules in the public key encryption module shown in FIG. 1.

FIG. 2 is a block diagram illustrating modules in the public key encryption module 120 shown in FIG. 1.

The public key encryption module 108 includes instructions to perform cryptographic operations. As shown, the public key encryption module 108 includes a modular multiplication module 202 and a modular reduction module 204. For example, the CPU 101 may issue a command to the public key encryption module 108 to perform modular exponentiation on g, e, and M value stored in memory 206. In an embodiment, the module multiplication module 202 in the public key encryption module 108, includes instructions when executed by the CPU 101 performs multiplication operations used by the Karatsuba algorithm to produce an intermediate result which is forwarded to a modular reduction module 204. The modular reduction module 204 includes instruction that when executed by the CPU 101 perform a modular reduction technique on the intermediate result that is side-channel attack resistant according to the principles of the present invention.

In an embodiment, a result $r=(A*B)$ mod m is computed, for 512-bit numbers A, B and m. Mathematical operations (multiply, add/subtract) are performed on a portion of the 512-bit numbers at a time, due to limitations on operand size. In one embodiment, the operand size is 128-bits. In another embodiment, the operand size is 256-bits.

$X=A*B$ is computed first. In one embodiment, the Karatsuba algorithm is used to compute X (a 1024-bit number) for the two 512-bit numbers (A, B). The Karatsuba algorithm is a well-known algorithm used to multiply large numbers. The operands are segmented and multiplication operations are performed on smaller segments. For example, n-bit numbers A and B can be represented as a set of smaller sized segments (two-term polynomials), $A(x)=(a_1 x+a_0)$ and $B(x)=(b_1 x+b_0)$, with $a_0 b_0$ representing the least significant bits of A and B and $a_1 b_1$ representing the most significant bits.

The Karatsuba algorithm multiplies the two two-term polynomials $(A(x)=(a_1 x+a_0)$ and $B(x)=(b_1 x+b_0))$, each having two coefficients $((a_1,a_0)$ and $(b_1 b_0))$, using three scalar multiplications as shown below:

$$X(x)=(a_1 x+a_0)(b_1 x+b_0)=a_1 b_1 x^2+((a_0+a_1)(b_0+b_1)-a_0 b_0-a_1 b_1)+a_0 b_0$$

Thus, four additions and three multiplications are required to compute the result X(x) of multiplying two two-term polynomials (A, B) using the Karatsuba algorithm. The Karatsuba algorithm may also be used to multiply two three-term polynomials using six scalar multiplications instead of nine multiplications.

Having computed intermediate result X, a modular reduction is performed to reduce X with respect to modulus m according to the principles of the present invention.

Figure 3:
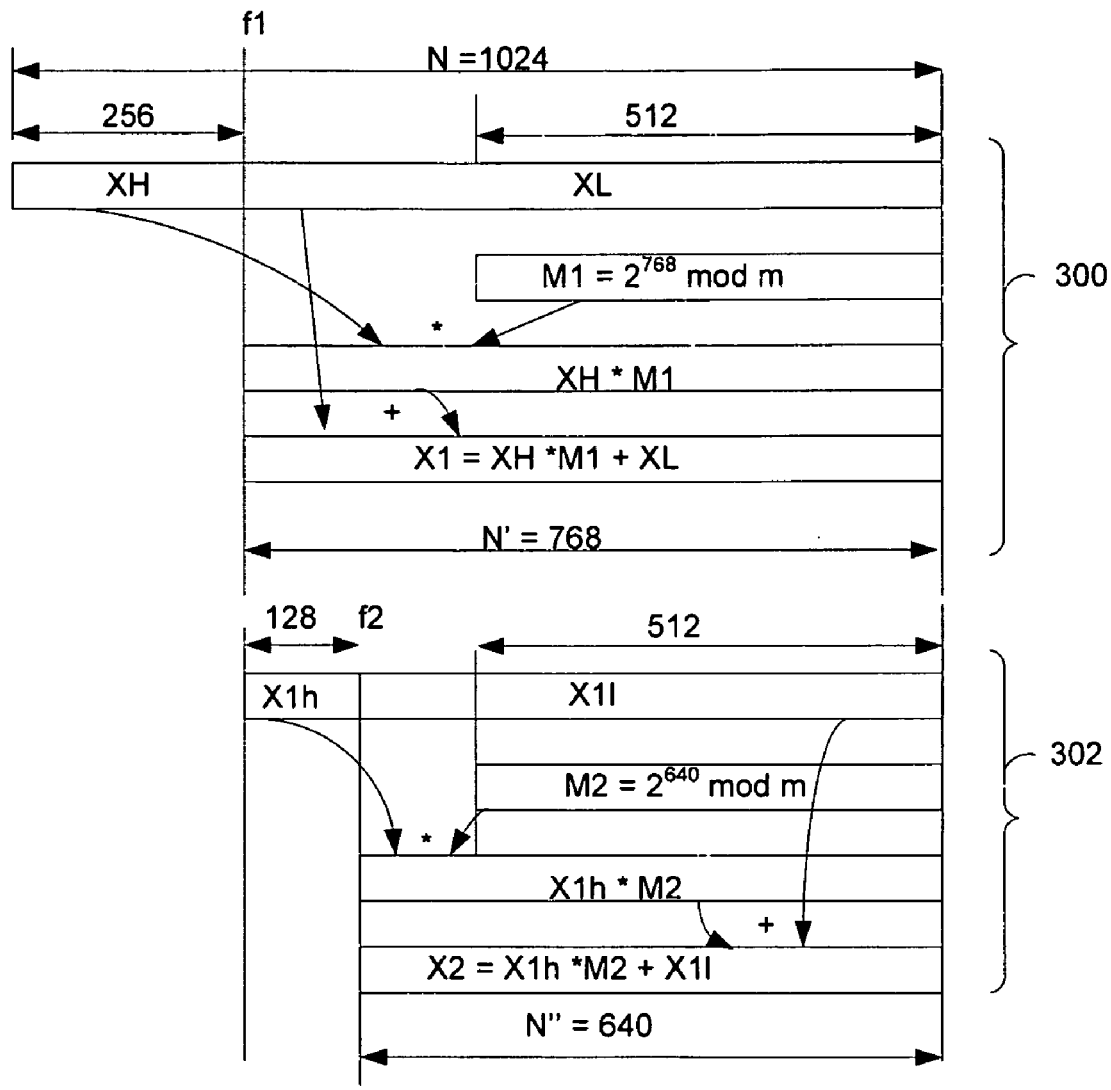
FIG. 3 illustrates a method to reduce the computational cost of modular reduction by folding a number X into a smaller number X2.

FIG. 3 illustrates a method to reduce the computational cost of modular reduction by folding a number X into a smaller number X2. The number X is first folded into a smaller number X1 such that X mod m is the same as (congruent to) X1 mod m. As discussed earlier, a number X is congruent to a number X1 if the remainder after dividing X by M is the same as the remainder after dividing X1 by M. The number X1 is then folded into a smaller number X2 such that X1 mod m is the same as (congruent to) X2 mod m. Modular reduction is then performed on the smaller number X2.

Referring to FIG. 3, a number X has a width of 1024-bits. A first "folding" operation generates X1 from X. As shown, the first folding occurs at folding point, f1, that delineates X into XH and XL. In the embodiment shown, for a modulus (m) having 512-bits, that is, X has 2*sizeof(m) bits (1024-bits), the first folding point is chosen to fall at the mid-point (768) of the length of the modulus (512) and the length of N (1024).

In the example shown where m has 512-bits and X has 1024-bits. The folding point f1 for the first "folding" operation (first iteration) is $2^{1.5*sizeof(m)}$, that is, $2^{768}$ and the folding point f2 for the second "folding" operation (second iteration) is $2^{1.25*sizeof(m)}$, that is, $2^{640}$.

Based on the first folding point, X1 can be determined as:

$$X1=XH*2^{f1} \bmod m+XL$$

And based on the second folding point, X2 can be determined as:

$$X2=X1h*2^{f2} \bmod m+X1l$$

The smaller X2 number resulting from the second folding operation can then be used to perform a modular reduction, for example, using the Barrett Reduction or the Montgomery Reduction.

The first "folding" operation 300 is performed by first dividing X, a 1024-bit number into two segments with the first fold point selected such that the most significant 256-bits of X are in the high-order bits segment (XH) and the lowest significant 768-bits of X are in the low-order bits segment (XL). Next, the product of M1 ($=2^{768}$ mod m, a 512-bit number which has been pre-computed) and XH is computed. The product of XH*M1 is a 768-bit number. In an embodiment, the product is computed using two 256-bit*256-bit multiplies (a first multiply with the 256-bit XH and the lower order 256-bits of the 512-bit M1 to produce a first 512-bit partial result and a second multiply with the 256-bit XH and the higher order 256-bits of the 512-bit M1 to produce a second 512-bit partial result) and one addition (to provide the 768-bit result which is the sum of the first 512-bit partial result and the second 512-bit result shifted by 256-bits).

Next the 768-bit result of XH*M1 is added to XL. As XL is a 768 bit number, the result will be at most 769 bits dependent on whether there is a carry. If X1 is a 769 bit number, a carry-flag is set and the $769^{th}$ bit is discarded, essentially performing the operation $X1=X1-2^{768}$.

A second folding operation 302 is performed on the 768-bit X1 to provide a 640-bit X2. As shown, the second folding occurs at folding point, f2, that delineates X1 into X1h (128 Most Significant Bits of X1) and X1l (640 Least Significant Bits of X1). Next, the product of M2 (=$2^{640}$ mod m, a 512-bit number which has been pre-computed) and X1h is computed. The product of X1h*M2 is a 640-bit number.

In an embodiment, the product X1h*M2 is computed with four 128-bit*128-bit multiplies and one 512-bit add giving a 640-bit result. X1l is also a 640-bit number. Next the 640-bit result of X1h*M2 is added to X1l. As X1l is a 640-bit number, the result will be at most 641-bits dependent on whether there is a carry. If X2s a 641-bit number, a carry-flag is set and the $641^{th}$ bit is discarded, essentially performing the operation $X2=X2-2^{640}$.

The size of the accumulated intermediate values (X1, X2) can be an odd-sized vector requiring special handling in each of the two folding operations. This special handling is cumbersome and results in performance loss especially when branch-invariant time is required. For example, the handling of a carry after each "folding" operation has different execution times dependent on the state of the carry ('1' or '0'). In order to make the handling of the carry side-channel safe, in an embodiment, the special handling of the carry is avoided by performing a lazy evaluation of the carry bits. During the first folding operation, having computed X1=XH*M1+XL, the final carry ($2^{768}$) is saved and the 768-bit Least Significant Bits (LSBs) of X1 are used in the second folding operation. In the second folding operation, having computed X2=X1h*M2+X1l, the final carry ($2^{640}$) is saved. In an embodiment, a single register can be used to store the respective carry bit (($2^{768}$, $2^{640}$) from each of the two folding operations.

After the two folding operations, the final reduction is performed on the smaller X2 number (640-bits) to provide a 512-bit number (result). In one embodiment, the final reduction is performed using Barrett reduction. In another embodiment, the final reduction is performed using Montgomery reduction.

Barrett reduction is a known method for reducing a first number (having 2k bits (for example 1024) modulo a second number (having k bits, for example, 512). Knowing that the k least significant digits of the 2k-bit first number are not necessary to compute a result, only a partial multiple-precision multiplication is necessary using a pre-computed constant $\mu$=floor($b^{2k}$/m), where b is the radix. If b is 2, then k is the number of bits in the first number and the second number.

An embodiment uses a modified Barrett Reduction Algorithm which is shown below:

$R=X2-m*\text{floor}((\mu*X2H)/2^{128})$

While (R>=m)
{R=R-m;}
where:

$\mu$=floor($2^{640}$/m), a 129-bit pre-computed number.

X2H is the top 128 bits of X2.

Two multiply operations are performed to compute the result R. The first multiply operation ($\mu$*X2H) multiplies a 129-bit number ($\mu$) with a 128-bit number (X2H) to provide a 257 bit number which is divided by $2^{128}$ to provide a 129-bit intermediate result R'. The second multiply operation (m*R') multiplies a 129-bit number (R') by a 512-bit number (m) to provide a 640-bit number. When the 640-bit number is subtracted from X2, the residue is less than 541-bits and can be reduced with a small number of repeated subtractions of the modulus m. The additional bit in the 129-bit numbers (operands) is cumbersome to handle on standard processors (for handling operands having an even number of bits).

The 640-bit X2 is reduced to a 512-bit residue R using Barrett-reduction. In an embodiment, the 129-bit operands are converted to 128-bit operands to improve performance of the multiply operations. The Barrett reduction is then performed using the 128-bit operands.

Figure 4:
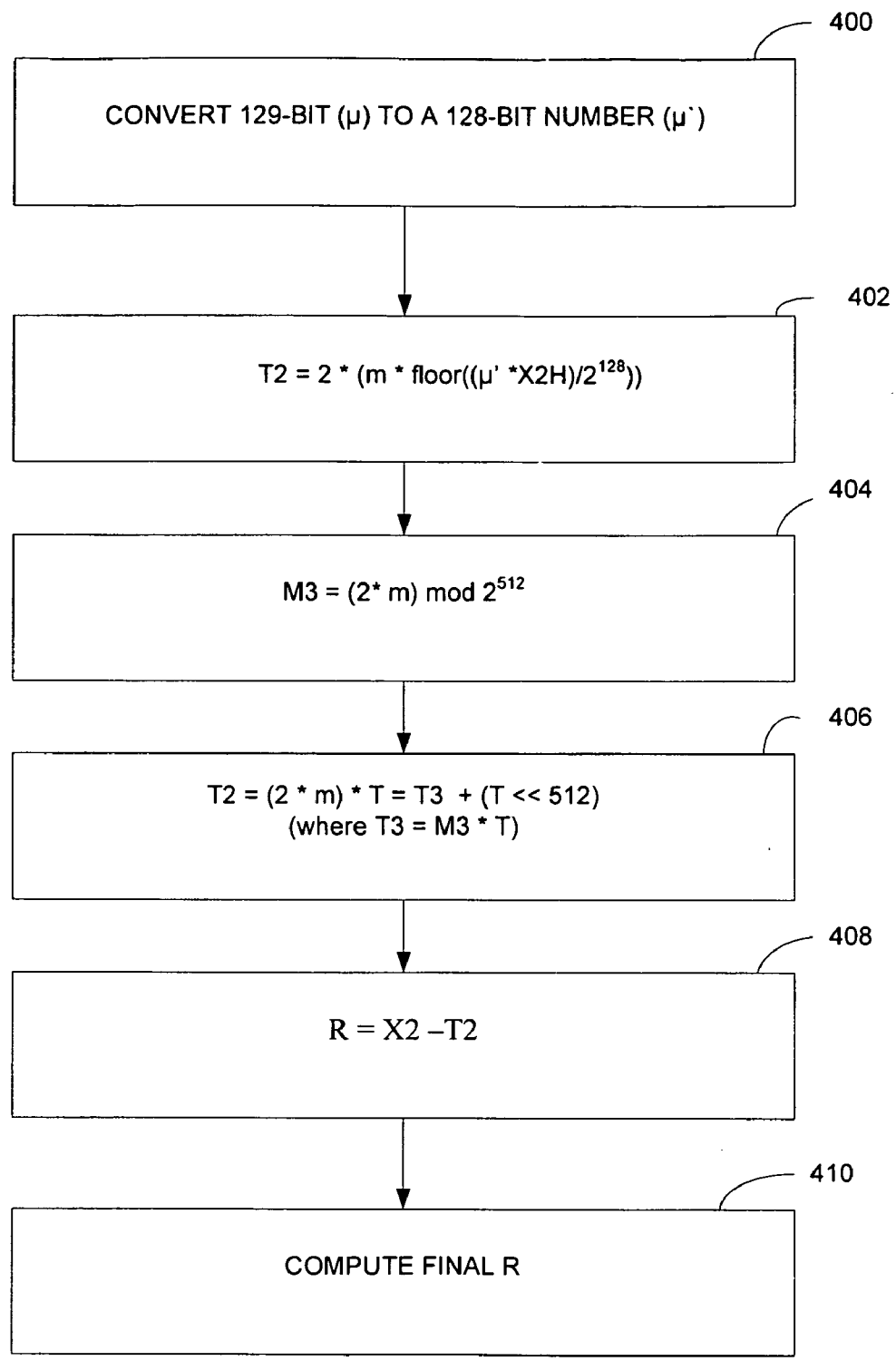
FIG. 4 illustrates an embodiment of a method for performing Barrett Reduction that is side-channel safe according to the principles of the present invention.

FIG. 4 is a flowchart of a method for performing Barrett reduction that is side-channel safe according to the principles of the present invention.

At block 400, the 129-bit constant number ($\mu$) is converted to a 128-bit number ($\mu'$) by shifting the 129-bit number ($\mu$) right by one-bit and discarding the least significant bit of the 129-bit number. For example, 129-bit number $\mu$=(floor($2^{640}$/m)) is replaced by a 128-bit $\mu'$=(floor($2^{640}$/m)>>1). Processing continues with block 402.

At block 402, to compensate for the one bit shift of $\mu'$, the modified Barrett's Algorithm is further modified by multiplying (m*floor(($\mu'$*X2H)/$2^{128}$)) by 2 as shown below:

$T2=2*(m*\text{floor}((\mu'*X2H)/2^{128}))$

This can be rewritten as the combination of two products $T2=(2*m)*T$ where $T=\text{floor}((\mu'*X2H)/2^{128})$ $T=\text{floor}((\mu'*X2H)/2^{128})$ results in shifting the result of ($\mu$*X2H)/$2^{128}$ left by one bit to compensate for the earlier one bit right shift. However, this shift operation does not recover the state of the dropped least significant bit of $\mu$ which does not affect the final result. T is constructed by multiplying $\mu$ with a 128-bit value. Ignoring the LSB of $\mu$ affects the value of T by only a very small amount. For example instead of the value T, the value can be T−1.

At block 404, M3=(2*m) mod $2^{512}$ is computed. To compute M3, the 512-bit modulus is shifted left by one bit and the 512 Least Significant Bits (LSB)s are stored as M3. The Most Significant Bit (MSB) is discarded but the value is not "lost" because the MSB of the modulus is always set to '1'. Processing continues with block 406.

Multiplying T by (2*m) to provide T2 uses even sized operands. First, the 128-bit T is multiplied with 512-bit M3, to provide intermediate product T3. Then, T3 is added to (T<<512). Processing continues with block 408.

At block 408, T2 is subtracted from X2 to provide current result R (R=X2−T2). Processing continues with block 401.

At block 410, prior to the final subtraction of the modulus to provide the final result R, the carry-bits from the first folding operation and the second folding operation that are stored in a carry register are used to retrieve a pre-computed value stored in Table 1 shown below that stores pre-computed values for all carry bits. The retrieved pre-computed value is then combined with the current result R.

TABLE 1

| Index | Value |
|-------|-------|
| 00 | 0 |
| 01 | M2 |
| 10 | M1 |
| 11 | (M1 + M2) mod m |

The values stored in Table 1 above can be pre-computed because they are static values. The carry bits resulting from the two folding operations discussed in conjunction with FIG.

3 that are stored in the carry register are used to index the table. The value stored in the indexed location is added to the current result R as follows:

$$R=R+\text{Table1}[\text{carry}];$$

Where R is the result and Table[carry] is the value stored at the location in Table 1 corresponding to the location (carry).

After the carry bits have been combined, the 515-bit number (intermediate result) is reduced to a final 512-bit number (final result). The 512 Least Significant Bits (LSBs) of the 515-bit number are stored in elements R[7]–R[0]. R[8] stores the 3 MSBs.

Another pre-computed Table (Table 2) stores pre-computed values for the three Least Significant Bits (LSB)s stored in R[8] to convert to a 512-bit final result R (with all bits of R[9] and R[8] set to '0').

TABLE 2

| Entry | Value |
| --- | --- |
| 000 | 0 |
| 001 | (1 << 512) mod m |
| 010 | (2 << 512) mod m |
| 011 | (3 << 512) mod m |
| 100 | (4 << 512) mod m |
| 10 | (5 << 512) mod m |
| 110 | (6 << 512) mod m |
| 111 | (7 << 512) mod m |

The value stored in the entry in Table 2 corresponding to the value of the three least significant bits in R[8] is added to R[7:0]. If the addition results in a carry, the carry is stored in R[8].

If the carry stored in R[8] is set, further subtractions of the 512-bit modulus are required in order to get the final 512-bit result which is less than the modulus m. However, in order to provide to provide time-invariant reduction, irrespective of the state of the carry, a constant-time masked subtract is performed, that is, the same number of subtractions (fixed number or constant number of subtraction operations) to subtract the modulus m or 0 are always performed irrespective of the state of the carry bit. The constant-time masked subtract will be described later in conjunction with an embodiment of Montgomery Reduction.

An embodiment has been described that provides a side-channel safe modular reduction that uses an iterative folding scheme based on a modified Barrett's Algorithm for 512 bit numbers. In other embodiments, the numbers can be greater than 512 bits.

In another embodiment, the reduction can be performed using side-channel resistant modified Montgomery reduction according to the principles of the present invention. Modified Montgomery reduction is a known method for reducing a first number (having 2k bits (for example 1024) modulo a second number (having k bits, for example, 512). The side-channel-resistant modified Montgomery reduction is similar to the side channel resistant modified Barrett reduction discussed earlier and has improved performance per iteration due to the lower number of vector add/sub/shift operations.

Montgomery reduction of (a*b) mod m with respect to C (where greatest common divisor (Gcd) (m, C)=1, and 0<= (a*b)) is defined as:

$$(a*b)C^{-1} \bmod m$$

$C^{-1}$ is the modular inverse of C mod m.

The two folding operations described in conjunction with FIG. 3 are used to reduce the 1024-bit result of X=a*b, (where a, b are 512-bit numbers) to a 640-bit number and to perform a lazy carry operation by storing the carry bits ($2^{768}$, $2^{640}$) from each of the two folding operations in a carry register as discussed in conjunction with FIG. 3 for Barrett Reduction. A modified Montgomery reduction is then performed on the 640-bit number to provide a 512-bit number. The modified Montgomery reduction reduces an (n+t)-bit number to an n-bit number where t is less than or equal to n in contrast to Montgomery reduction which reduces a 2n-bit number to an n-bit.

In an embodiment, a modified Montgomery reduction is performed on the 640-bit number (X) to provide a 512-bit number, by performing a sequence of operations to combine the information in the 640-bit value into the 512-bit Most Significant Bits (MSB)s of the 640-bit value, so that the least significant "zeroed" 128-bits can be eliminated. In this embodiment, n is 512-bits and t is 128-bits. The 640-bits are thus split into asymmetric portions: a 512-bit portion (n-bits) and a 128-bit (n/4-bit) portion. This sequence of operations can be represented as follows:

$$X+Q*m \equiv 0 \bmod 2^{128}$$

where:
X is the 640-bit number to be reduced;
Q is dependent on a constant non-negative 128-bit number k1;
$k1=((-1)*m^{-1}) \bmod 2^{128}$ is pre-computed and stored for use in the Montgomery reduction operations; and
(Q*m) is a 640-bit number.

A software routine that performs a different set of instructions based on the value of a carry flag is not time invariant because it has a different execution time dependent on the state of the carry flag. In an embodiment, a time-invariant routine to handle the carry flag is provided which will be discussed later in conjunction with FIG. 6.

Figure 5:
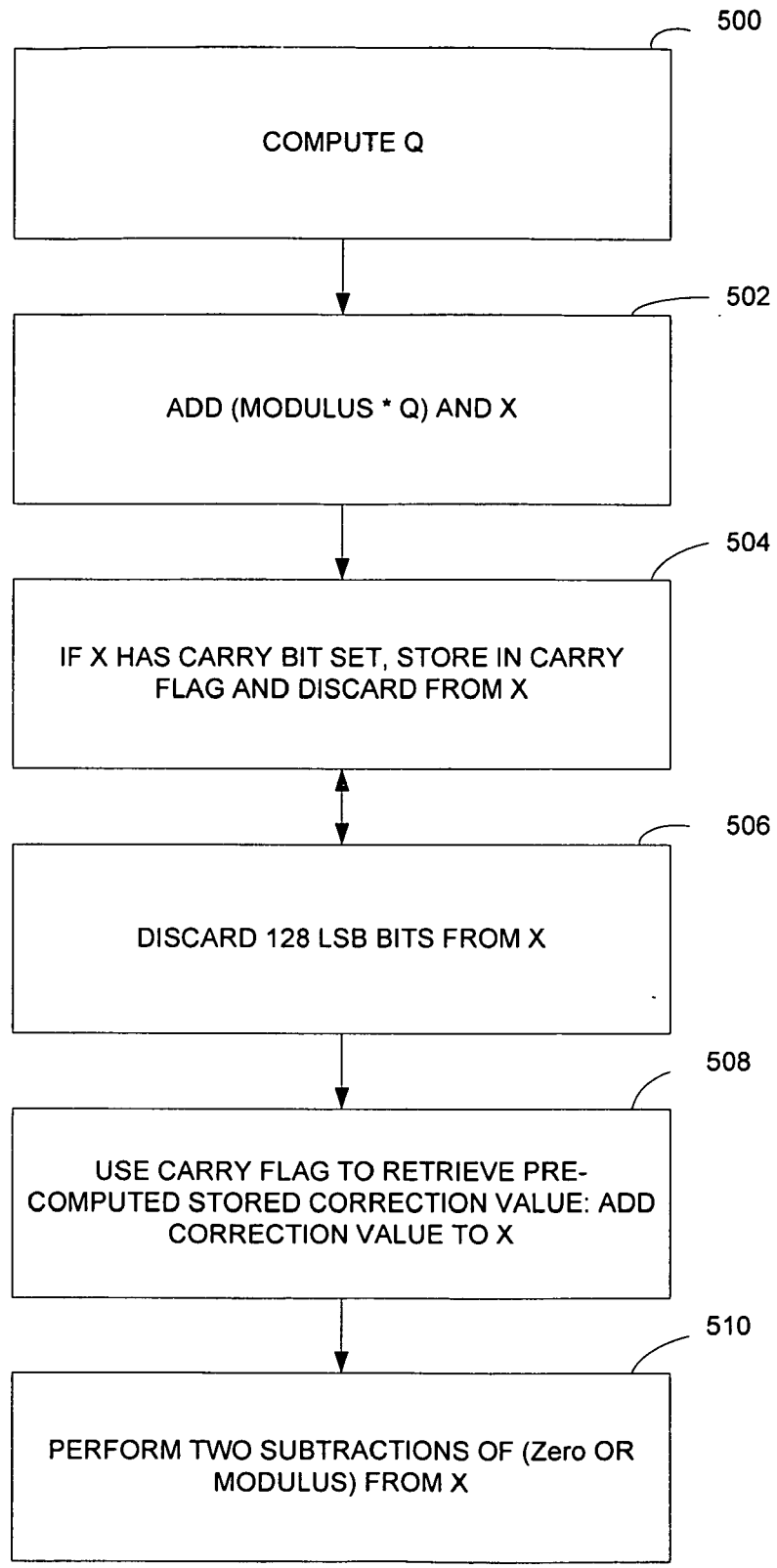
FIG. 5 illustrates an embodiment of a method for performing modified Montgomery Reduction that is side-channel safe according to the principles of the present invention.

FIG. 5 illustrates an embodiment of a method for performing modified Montgomery reduction that is side-channel safe according to the principles of the present invention.

At block 500, the 128-bit constant value k1 is multiplied by the least significant 128 bits of the 640-bit X (that is, X1) to provide a 256-bit value which is reduced modulus $2^{128}$ to provide a 128-bit Q. Processing continues with block 502.

At block 502, the 512-bit modulus is multiplied by the 128-bit Q and the 640-bit result is added to the 640-bit X. Processing continues with block 504.

At block 504, the result of the prior computation may have resulted in a carry (that is, a 641-bit set to '1' in X). Instead of handling the carry at this time, the carry is stored in a carry register and the carry is discarded from X by dropping bit 641. Processing continues with block 506.

At block 506, the Montgomery algorithm guarantees that after the addition performed in block 502, the required number of LSBs in the sum are zero. Thus, as each of the LSB 128-bits of X is zero, the LSB 128-bits of X are dropped by shifting X right by 128-bits. The result of shifting the LSB 128-bits of X is a shifted product, that is, $a*b*2^{-128}$. Processing continues with block 508.

At block 508, the values of three carries stored in the carry register is used to index a table (shown below as Table 3) that stores pre-computed values to be added to X.

TABLE 3

| Entry | Value |
| --- | --- |
| 000 | 0 |
| 001 | $2^{512}$ mod m |
| 010 | $2^{512}$ mod m |

TABLE 3-continued

| Entry | Value |
|---|---|
| 011 | $2^{513}$ mod m |
| 100 | $2^{640}$ mod m |
| 101 | $2^{640}$ mod m + $2^{512}$ mod m |
| 110 | $2^{640}$ mod m + $2^{512}$ mod m |
| 111 | $2^{640}$ mod m + $2^{513}$ mod m |

For example, if all carry bits (3 carry bits) are zero, that is, there was no carry produced in the two folding operations and no carry produced in the Montgomery reduction, zero is added to X. Processing continues with block 510.

At block 510, m is subtracted from X until X is less than m. Typically, only one subtraction of m is required, but two subtractions may be necessary. In order to provide time-invariant reduction, a constant-time masked subtract is performed, that is, a constant number of subtractions is performed by subtracting m or 0. In an embodiment two subtractions are always performed, to subtract m and/or 0 from X.

A conditional branch is not branch-invariant in terms of timing because it is only performed if the condition is true. An example of a conditional branch is shown below:

```
If (X >= 2640)
{
    Cf |= 1;
    X = X % 2640
}
```

Figure 6:
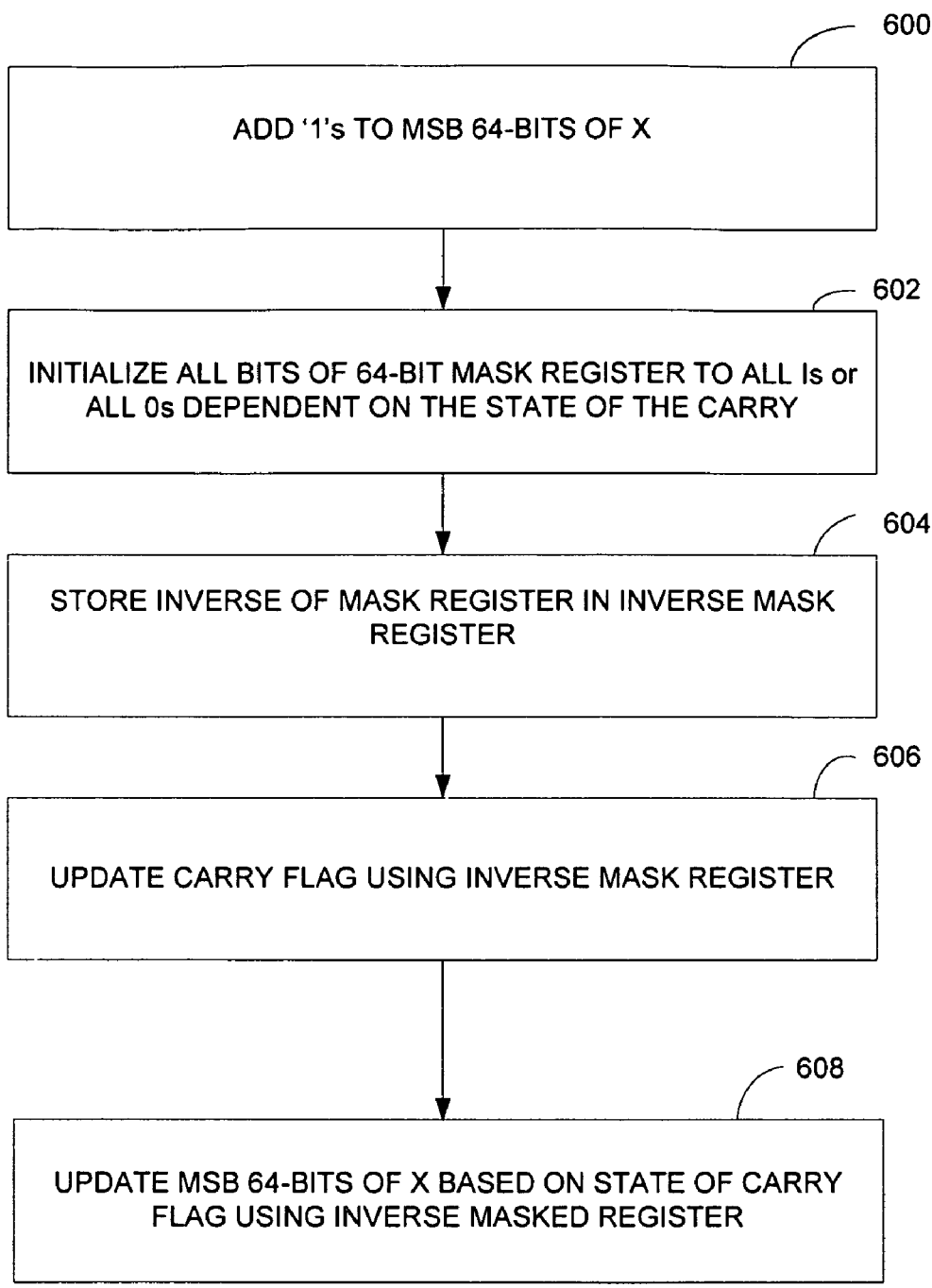
FIG. 6 is a flowgraph of a constant time masked subtract for use in a time invariant software routine (that is side-channel safe) based on value of a carry flag.

FIG. 6 is a flowgraph of a constant time masked subtract for use in a time invariant software routine (that is side-channel safe) based on value of a carry flag.

At block 600, 64-bits set to '1' are added to the most significant quadword (64-bits) of X. Processing continues with block 602.

At block 602, a 64-bit mask register is initialized with all bits set to 1 (carry bit set) or all bits set to 0 (carry bit cleared) dependent on the state of a carry bit. In an embodiment two instructions are used to initialize a mask register (t) as shown below:

$t=0$;

$cmov(t=0xFFF...FF, \text{carry flag})$

Processing continues with block 604.

At block 604, a 64-bit inverse mask register is set to the inverse of the mask register value. Processing continues with block 606.

At block 606, the carry flag is updated based on the value of the masked register. In an embodiment, two instructions are used to modify the carry flag register (cf) as shown below:

$t=t'(t<<1)$;

$cf|=t$;

Processing continues with block 608.

At block 608, the inverse masked register is ANDed with the MSB quadword of X.

Thus, the same number of operations are performed irrespective of the value of the carry flag to replace the conditional carry routine with a routine that is time-invariant and side-channel safe.

The lookup tables are typically stored in cache. However, in addition to time-varying routines, a key may be learned through the use of cache-based attacks. One known means to determine the value of a key is to monitor the cache lines that are accessed to retrieve data stored in a data cache. Typically, only one of a plurality of cache lines stores the data to be retrieved. Thus, the cache line address that is used to retrieve the data may be used to discover the key. In an embodiment, a vector is distributed amongst all cache lines in the cache so that all cache lines are read for each vector.

Figure 7:
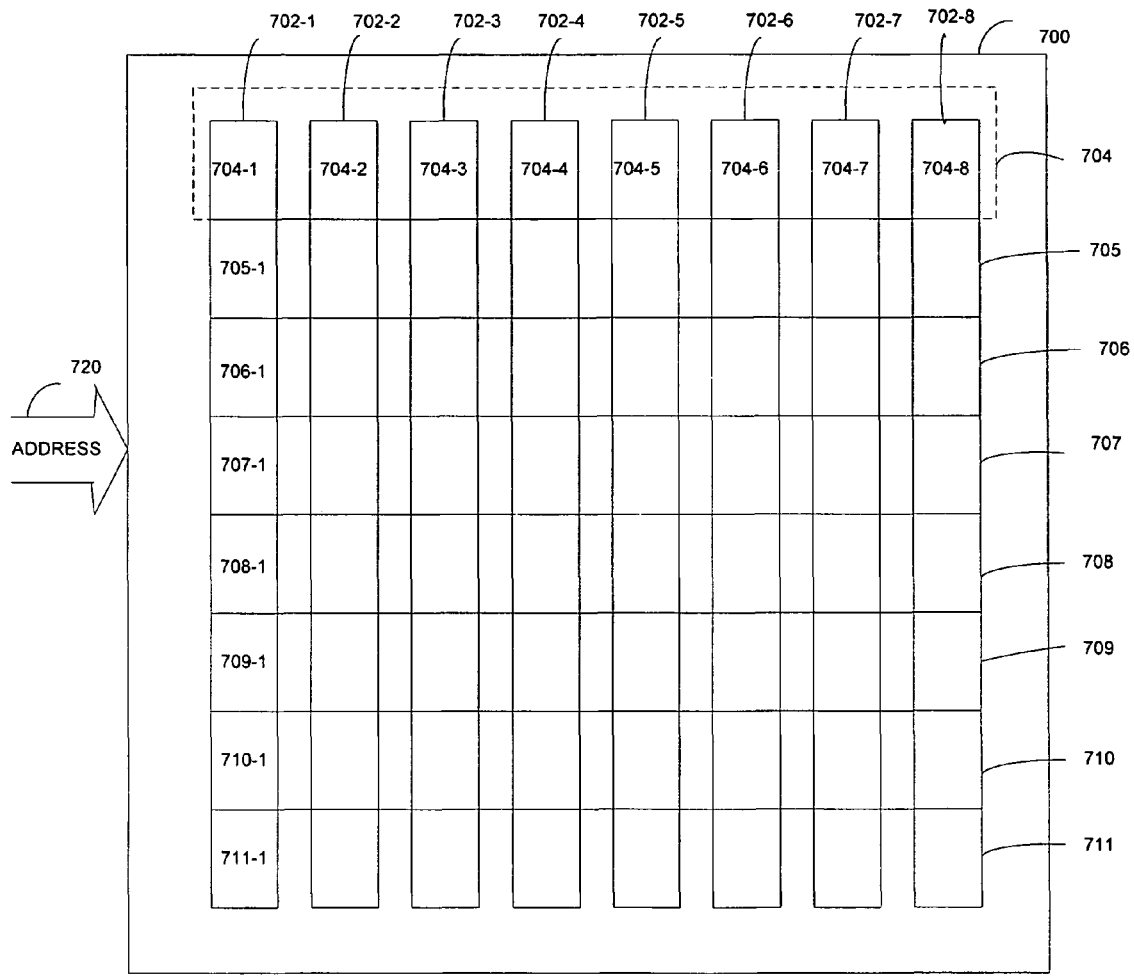
FIG. 7 is a block diagram illustrating an embodiment of how data stored in a lookup table is stored in a data cache to avoid cache-based attacks.

FIG. 7 is a block diagram illustrating an embodiment of how data stored in a lookup table is stored in a data cache to avoid cache-based attacks. In an embodiment, a lookup table 700 stored in data cache is dispersed optimally along consecutive cache lines in a data cache such that all of the cache lines associated with the lookup table are always accessed to retrieve any data stored in the lookup table.

Typically, in a data cache having 64-byte (512-bit) wide cache lines, each 512-bit cache line 704, . . . 711 is distributed over eight 64-bit (8-byte) wide memory banks 702-1 . . . 702-8. The address 720 selects one of the 512-byte cache lines 704, . . . 711 to access to retrieve one or more 64-bit blocks from one or more of the respective eight 64-bi wide banks 702-1, . . . 702-8.

In an embodiment of the present invention, the data for a 512-bit entry in the table 700 is dispersed optimally over consecutive cache lines 704, . . . , 711 so that all of the cache lines 704, . . . , 711 in the data cache 700 are read in to access any value.

For example, Table 2 discussed earlier has eight 512-bit (64-byte) entries which can be stored in the data cache 700 shown in FIG. 7.

In an embodiment in which a cache line size is 512 bits, for example, an Intel IA processor, and each value in Table 2 is 512-bits all of the eight 512-bit values in Table 2 can be stored using eight 512-bit cache lines 704, . . . , 711.

The eight 512-bit values shown in Table 2 are dispersed among the eight 512-bit cache lines 704, . . . 711 in the data cache on a 64-bit (quadword) level with the starting pointer for each value (vector) shown in Table 2 being 512-bits (eight quadwords) more than the starting value for the previous value. For example, a 512-bit value can be dispersed among the eight 12-bit cache lines 704, . . . , 711 with a 64-bits portion of the 512-bit value stored in 64-bit segments 902-1, . . . 902-8 of each 512-bit cache line 704, . . . 711 such that each value is accessed starting at the start pointer (address) of the value for cache line 704 and then incrementing the pointer by 512-bits (8 quadwords), thus accessing all cache lines 704, . . . 711 storing the table to retrieve the 512-bit value. The values are dispersed based on the size of the cache line so that there is no performance penalty to read all cache lines 704, . . . 711 to retrieve the 512-bit value because the size of each 512-bit value matches the granularity of the compute operations, that is, the operand size of the vectors. In an embodiment, all of the cache lines are read sequentially in the same order regardless of which vector is used.

For example, in an embodiment each 512-bit vector (entry) in pre-computed Table 2 can be implemented as an array of 8 64-bit words which are distributed one per cache line 704, . . . 711. In this example, there are exactly 8 vectors occupying 8 cache lines and each cache line stores 8 32-bit words.

In an alternate embodiment, Table 1 and Table 2 can be merged into a single table storing 32 512-bit vectors (values). The single table with 32 512-bit entries allows a single combined correction step to be performed. Index computation (5-bit index) for the single table (having 32 entries) can be computed as follows:

$index=(R/8]<<2)+\text{carry bits}$;

The index has 5-bits, three LSBs from R[8] that are stored in bit positions [4:2] of the 5-bit index and the two carry bits from the two folding operation stored in bit positions [1:0] of the 5-bit index. This embodiment improves performance at the expense of larger overall data structure sizes (that is, one table instead of two separate tables (Table 1 and Table 2)).

For 512-bit operand sizes, the operands can be viewed as 64 bytes (512-bits) of data. Instead of using a byte-level scatter/gather operation over the cache lines, a cache line size of 64 bytes and 32 vectors each having 64-bytes (512-bits) is used. The table is aligned to start at the first byte of a 64-byte cache-line.

Each 64-byte vector (512-bit value) can be represented as an array of 32 unsigned short integers, with each unsigned short integer having 2 bytes.

Figure 8:
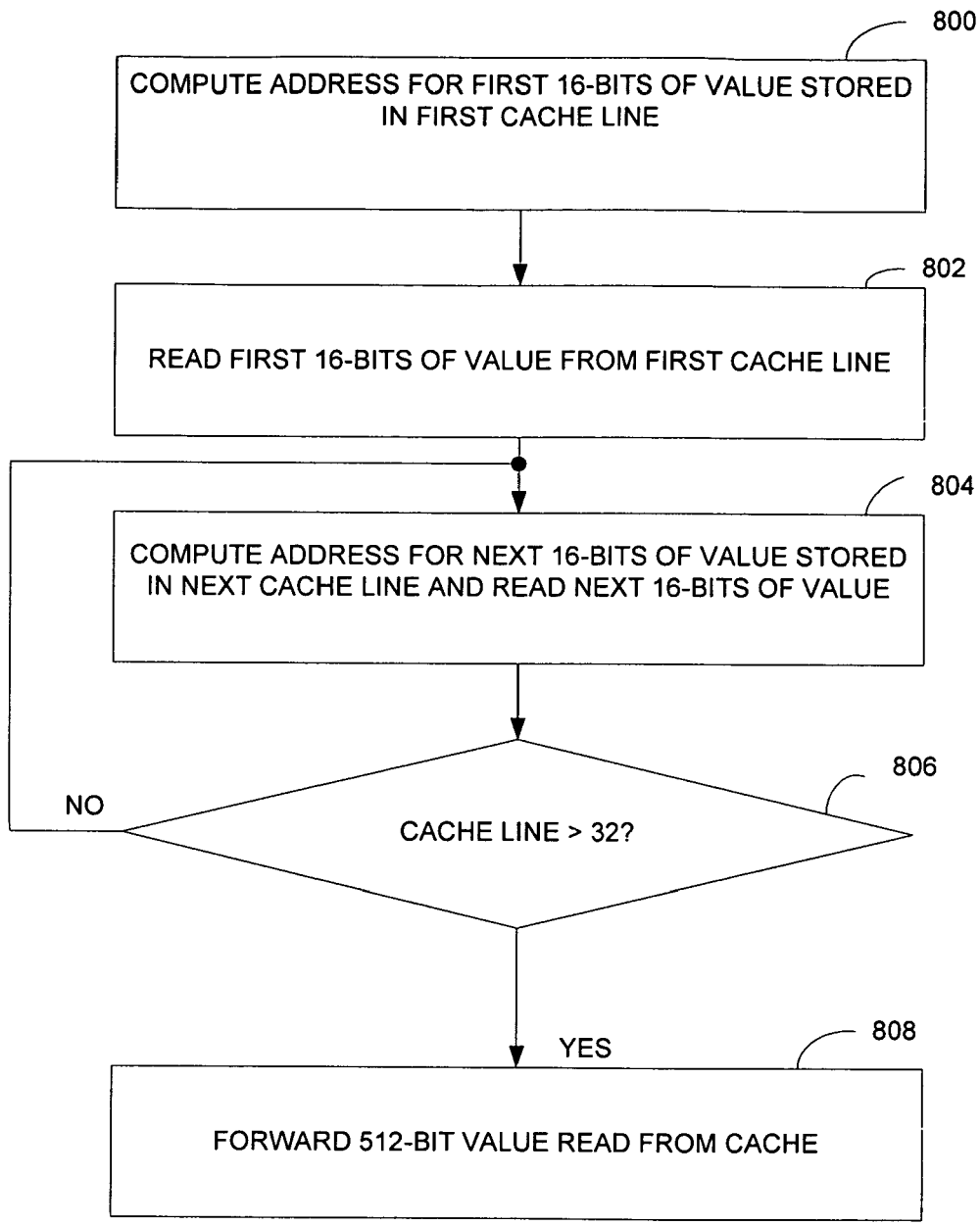
FIG. 8 illustrates an embodiment of a method to access a value in the table to avoid leaking cache-based side-channel information.

FIG. 8 illustrates an embodiment of a method to access a value in the table to avoid leaking cache-based side-channel information.

At block 800, the address for the first 32-bits of the value stored in the first cache line is computed. A sample instruction is shown below:

short*start=*bptr*[index];

where: index is the cache line number (0<=index<32);
Base pointer to the table is of type short and represented by bptr.

Processing continues with block 800.

At block 802, the first 16-bits of value are read from the first cache line and stored in the first element of an array of 32 shorts (16-bit values). A sample instruction is shown below:

*vec*[0]=*start where vec[ ] is a 32 element array of shorts (16-bit values). Processing continues with block 804.

At block 804, the address for the next 16-bits of the value stored in the next cache line is computed and the 16-bit value is read from the computed address. Sample instructions are shown below:

start=start+32; //same position in next cache line, 64 bytes away

*vec*[i]=*start;

Processing continues with block 806

At block 806, if the last cache line (32) has been processed, processing continues with block 808. If not, processing continues with block 804 to read the next 16-bits of the value stored in the cache line.

At block 808, the 512-bit value read 16-bits at a time from each of the 32 512-bit entries in the cache has been read from the cache. Processing is complete.

The quadwords (64-bits) in the 512-bit value can be accessed using the sample instruction below:

Qword0=*((*uint64**)*vec*);

An embodiment extends reduction methods such as Montgomery Reduction and Barrett Reduction with folding and side-channel resistance to branch-based attacks. The use of table lookups combined with carry-saving techniques provides an embodiment of modified Montgomery reduction and modified Barrett reduction that is also time-invariant and as efficient as modified Montgomery and modified Barrett reduction that is vulnerable to side-channel attacks. The cache dispersion techniques are optimal and ensure that large word level dispersions are performed so as to provide the same effect as slower byte scatter/gather schemes. The techniques are combined with exponent windowing to maintain constant-time invariance.

Alternative embodiments of the invention also include machine-accessible media containing instructions for performing the operations of the invention. Such embodiments may also be referred to as program products. Such machine-accessible media may include, without limitation, computer readable storage media having instructions (computer readable program code) stored thereon such as floppy disks, hard disks, Compact Disk-Read Only Memories (CD-ROM)s, Read Only Memory (ROM), and Random Access Memory (RAM), and other tangible arrangements of particles manufactured or formed by a machine or device. Instructions may also be used in a distributed environment, and may be stored locally and/or remotely for access by single or multi-processor machines.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method comprising:
operable on one or more processors;
storing a state of a fold carry bit resulting from a result of a fold operation to reduce an a-bit number A to a b-bit number B wherein the b-bit number B is reduced modulus m to an n-bit number R, b equal to (t+n) and t less than n, using Barrett Reduction;
using the stored state of the fold carry bit to retrieve a pre-computed constant number corresponding to the state of the fold carry bit and position of the fold carry bit with respect to A, the pre-computed constant used to reduce the b-bit number B modulus m in a time-invariant manner to an r-bit result R;
performing time-invariant Barrett Reduction comprising:
converting 129-bit operands to 128-bit sized operands;
performing a multiplication by two of an addition term using pre-computed conversion constant numbers stored in a table; and
performing a fixed number of subtraction operations.

2. The method of claim 1, further comprising:
distributing pre-computed constant numbers amongst a plurality of cache lines in a cache memory such that all of the cache lines to store pre-computed constant numbers are read to retrieve the pre-computed constant number.

3. The method of claim 1, further comprising:
retrieving the pre-computed constant number by reading a portion of the pre-computed constant number from each of all of a plurality of cache lines in a cache memory storing pre-computed constant numbers.

4. The method of claim 1, further comprising:
performing an addition of a pre-computed constant number stored in another table to the least significant n-bits of the b-bits of B, the pre-computed constant number corresponding to the state of a portion of the least significant bits of t.

5. A method comprising:
operable on one or more processors;
storing a state of a fold carry bit resulting from a result of a fold operation to reduce an a-bit number A to a b-bit number B wherein the b-bit number B is reduced modulus m to an n-bit number R using Montgomery Reduction wherein b is (n+t) and t is less than n; and
using the stored state of the fold carry bit to retrieve a pre-computed constant number corresponding to the state of the fold carry bit and position of the fold carry bit with respect to A, the pre-computed constant used to reduce the b-bit number B modulus m in a time-invariant manner to an r-bit result R;

performing time-invariant Montgomery Reduction comprising:

performing a lazy evaluation of a reduction carry bit using pre-computed conversion constant numbers stored in a table; and performing a fixed number of subtraction operations.

6. The method of claim 5, wherein a is 1024 and b is 640 and two fold operations are performed to reduce A to B.

7. An apparatus comprising:

one or more processors;

memory configured to the one or more processors, to store a state of a carry bit resulting from a result of a fold operation to reduce an a-bit number A to a b-bit number B wherein the b-bit number B is reduced modulus m to an n-bit number R, b equal to (t+n) and t less than n, using Montgomery Reduction;

a lookup table to store a pre-computed constant number corresponding to the state of the carry bit and position of the carry-bit with respect to A; and logic to use the stored state of the carry-bit to retrieve the pre-computed constant number from the lookup table and to use the retrieved pre-computed constant to reduce the b-bit number B modulus m in a time-invariant manner to an r-bit result R;

wherein the logic to perform a lazy evaluation of a reduction carry bit using pre-computed conversion constant numbers stored in a table and to perform a fixed number of subtraction operations.

8. The apparatus of claim 7, wherein a is 1024 and b is 640 and two fold operations are performed to reduce A to B.

* * * * *